United States Patent
Gao

(10) Patent No.: US 9,584,365 B2
(45) Date of Patent: Feb. 28, 2017

(54) SERVER AND METHOD FOR SETTING A MODE OF THE SERVER

(71) Applicants: AMBIT MICROSYSTEMS (SHANGHAI) LTD., Shanghai (CN); HON HAI PRECISION INDUSTRY CO., LTD., New Taipei (TW)

(72) Inventor: Yong Gao, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 851 days.

(21) Appl. No.: 13/942,745

(22) Filed: Jul. 16, 2013

(65) Prior Publication Data

US 2014/0025797 A1 Jan. 23, 2014

(30) Foreign Application Priority Data

Jul. 19, 2012 (CN) .......................... 2012 1 0251320

(51) Int. Cl.
*G06F 15/16* (2006.01)
*H04L 12/24* (2006.01)
*H04L 29/12* (2006.01)

(52) U.S. Cl.
CPC ...... *H04L 41/0806* (2013.01); *H04L 61/2015* (2013.01)

(58) Field of Classification Search
CPC .................. H04L 41/0806; H04L 61/2015

USPC ........................................................ 709/220
See application file for complete search history.

(56) References Cited

U.S. PATENT DOCUMENTS

| 8,775,589 B2 | 7/2014 | Liss et al. |
| 2009/0049048 A1 | 2/2009 | Justen et al. |
| 2011/0268165 A1* | 11/2011 | Lo ...................... H04L 61/2015 375/222 |
| 2014/0282920 A1* | 9/2014 | Tian ................... H04L 61/2015 726/4 |

FOREIGN PATENT DOCUMENTS

| CN | 1759577 A | 4/2006 |
| CN | 101330531 A | 12/2008 |
| CN | 101627379 | 1/2010 |
| CN | 102098354 A | 6/2011 |
| CN | 102130776 | 7/2011 |
| CN | 102130776 A | 7/2011 |
| KR | 2002-0090961 A | 12/2002 |

* cited by examiner

*Primary Examiner* — Bryan Lee
(74) *Attorney, Agent, or Firm* — Zhigang Ma

(57) ABSTRACT

A method for setting a mode of a server includes setting the mode of the server to the negative mode when the sever boots, monitoring the network to detect a DHCP offer packet provided by another DHCP server in the network, setting the mode of the server to the positive mode when no DHCP offer packet is provided by the another DHCP server in the network and analyzing the DHCP offer packet to determine the mode of the another DHCP server when the DHCP offer packet is provided by the another DHCP server in the network. The modes of the server can be set automatically according to a state of a network in which the server works.

20 Claims, 5 Drawing Sheets

SERVER AND METHOD FOR SETTING A MODE OF THE SERVER

BACKGROUND

1. Technical Field

Embodiments of the present disclosure generally relate to servers, and more particularly to a method for setting a mode of a server.

2. Description of Related Art

A server include a system with hardware and software that responds to requests across a computer network to provide, or help to provide network service.

The dynamic host configuration protocol (DHCP) is a network protocol used to configure devices that are connected to a network so the devices can communicate on the network using the Internet protocol (IP). In the network, in accordance with transmission control protocol/Internet protocol (TCP/IP), a client can communicate with other devices in the network with an IP address. A DHCP server may allocate an IP address to the client in response to a request received from the client. With dynamic allocation, if there is the request from a client, the DHCP server selects and allocates an IP address which is not presently allocated to other clients, within an IP address range preset by a network manager.

However, several DHCP servers in the network may allocate IP addresses to the client in response to the request, and the client will use one IP address that is received firstly, which cause a waste of IP addresses and a conflict among the DHCP servers in the network.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
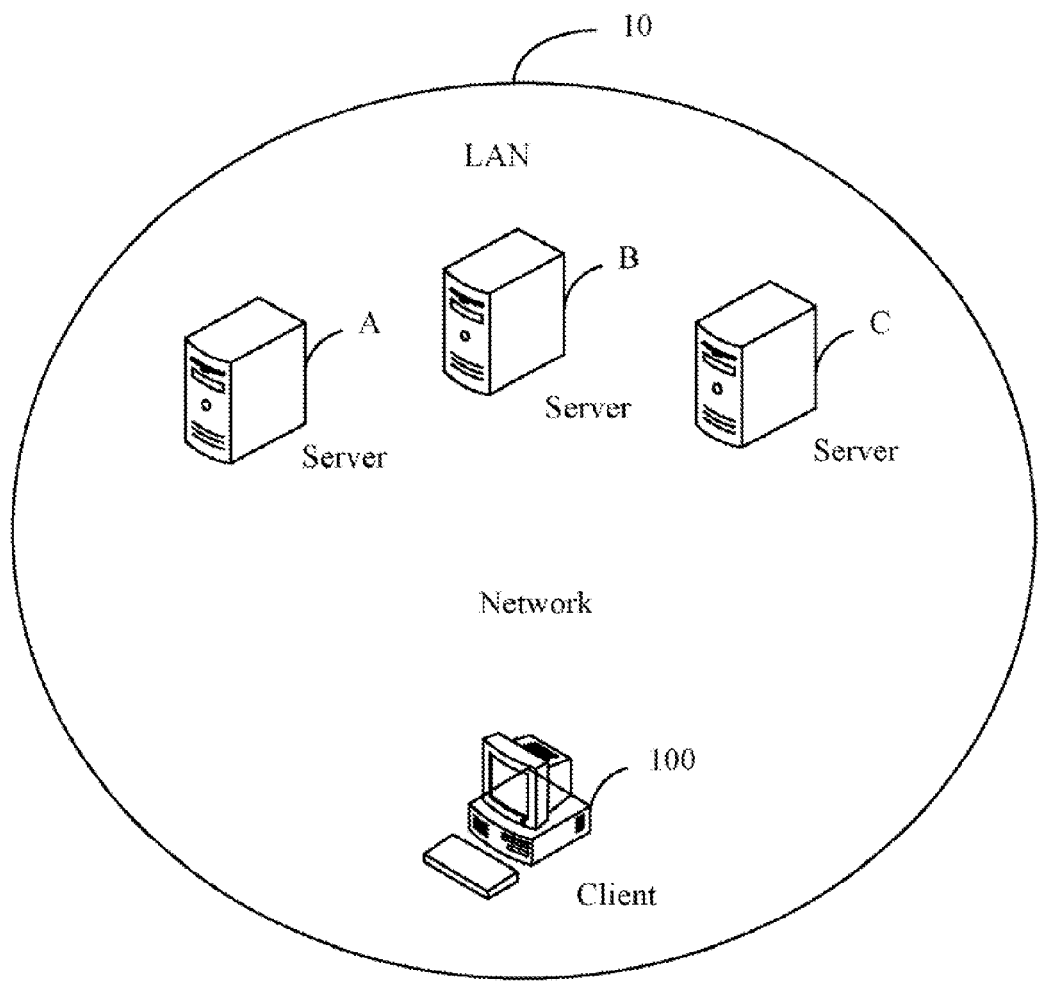
FIG. 1 is a schematic diagram of an application environment of one embodiment of a server in accordance with the present disclosure.

FIG. 1 is a schematic diagram of an application environment of one embodiment of a server in accordance with the present disclosure. In the present embodiment, a client 100, a server A and two other servers B and C work in a Local Area Network (LAN) 10. In one embodiment, the client 100 may wirelessly communicate with the servers mentioned above, or may communicate with the servers by a wired connection. The client 100 may be selected from the group including a personal computer (PC), a personal digital assistant (PDA), and mobile phone. The servers A, B and C operate according to the Dynamic Host Configuration Protocol (DHCP) and allocate IP addresses to the client 100 automatically in response to a DHCP discover packet received from the client 100.

In one embodiment, other clients and servers may work in the LAN 10 at the same time. The following introduces the present disclosure in detail by taking the client 100 and the servers A, B and C as an example.

In one embodiment, a mode of the server A is selected from the group including a positive mode and a negative mode. When the server A operates in the positive mode, the server A provides DHCP service in the LAN 10 and allocates an IP address to the client 100 automatically in response to a DHCP discover packet received from the client 100. When the server A operates in the negative mode, the server A does not provide DHCP service in the LAN 10.

In the present embodiment, when boots up, the server A broadcasts a DHCP discover packet at an interval in the LAN 10 to detect DHCP offer packets transmitted by the servers B and C in the LAN 10 and sets the mode of the server A to the negative mode. In one embodiment, the interval may be two seconds and varies depending on the practical need.

After a short duration, such as ten seconds, the server A switches to the positive mode when the server A does not detect any DHCP offer packet transmitted by the servers B and C, and then the server A provides DHCP service in response to the DHCP discover packet received from the client 100.

If the server A detects the DHCP offer packets transmitted by the servers B and C, the server A analyzes the DHCP offer packets to determine the mode of the other servers. In one embodiment, the DHCP offer packets may record modes, runtimes and random back-off times of the servers B and C. In one embodiment, the runtime refers to a time during which a server has operated in the LAN 10, and the random back-off time refers to a random waiting time after which a server provides the DHCP offer packet. If the DHCP offer packets do not record modes, runtimes and random back-off times of the servers B and C, it means that the servers B and C can not operate in several modes, and the server A labels the modes of the servers B and C as the negative modes and the runtimes of the servers B and C as zero. If the servers B and C operate in the positive modes, the server A maintains itself in the negative mode and does not provide DHCP service in the LAN 10.

If the servers B and C operate in the negative modes as the server A, the server A compares the runtime of the server A with the runtimes of the servers B and C respectively. If the runtime of the server A is less than at least one of the runtimes of the servers B and C, the server A maintains itself in the negative mode. If the runtime of the server A is greater than the runtimes of the servers B and C, the server A sets its mode to the positive mode. If the runtime of the server A is equal to the runtimes of the servers B and C, the server A compares the random back-off time of the server A with the random back-off times of the servers B and C and maintains itself in the negative mode upon the condition that the random back-off time of the server A is not greater than at least one of the random back-off times of the servers B and C, and sets its mode to the positive mode and provides DHCP service to the client 100.

In one embodiment, the runtime of the server A includes a delay, and the delay is calculated according to a formula: the delay=(a time that the server A receives the DHCP offer packet−a time that the server A transmits the DHCP discover packet)/2.

In one embodiment, the random back-off time of the server A is created at random within a predefined scope of the random back-off time when the server A boots up, and the predefined scope of the random back-off time ranges from three to five times as long as the interval of the broadcasting of the DHCP discover packet. For example, if the interval is two seconds, the predefined scope of the random back-off time ranges from six to ten seconds.

In one embodiment, the mode of the server A is a supervisor mode in which the server A provides DHCP service all the time regardless of the mode of the servers B and C, and the supervisor mode of the server A can be set according to a command of a user.

Figure 2:
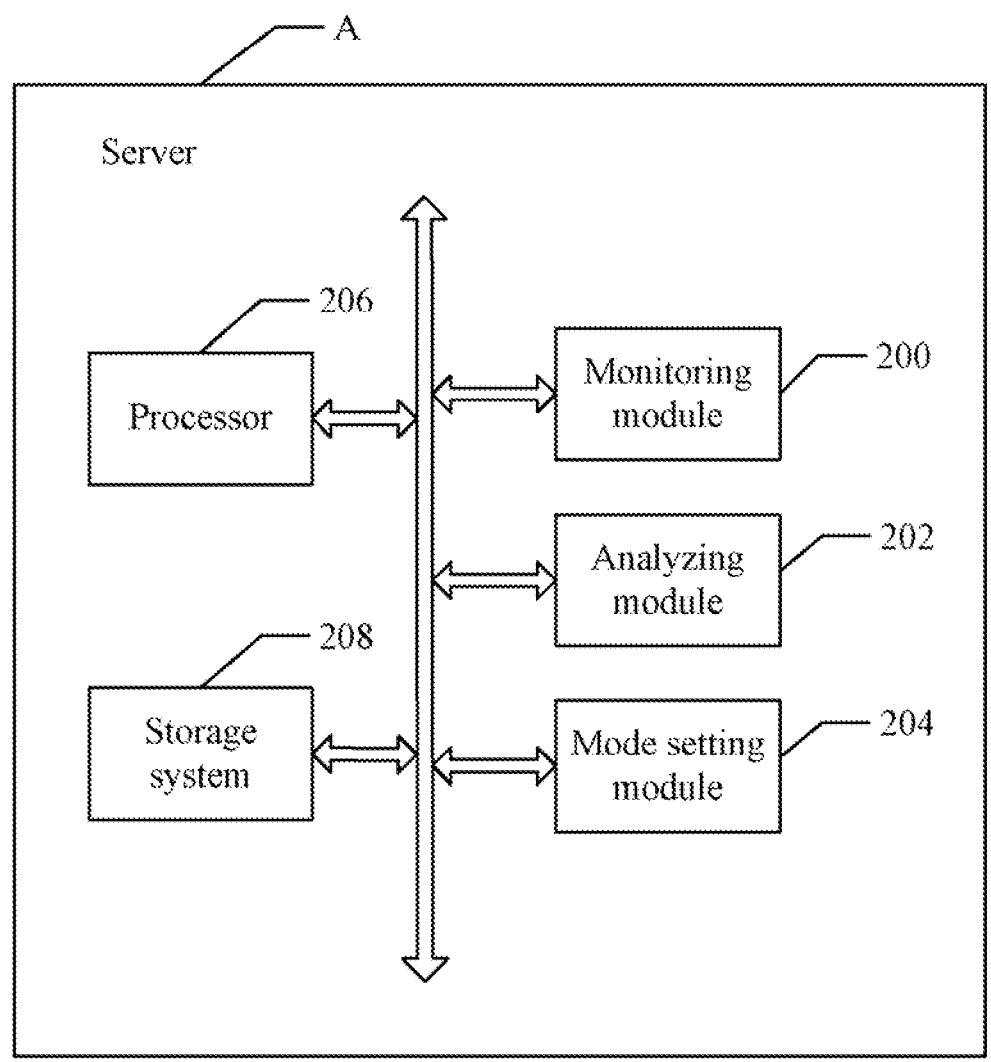
FIG. 2 is a block diagram of functional modules of the server in FIG. 1.

FIG. 2 is a block diagram of functional modules of the server A in FIG. 1. The servers B and C are equivalent to the server A, and the following introduces the present disclosure in detail by mainly taking the server A as an example.

The server A includes a monitoring module 200, an analyzing module 202, and a mode setting module 204, a processor 206 and a storage system 208. The modules 200-204 may comprise computerized code in the form of one or more programs that are stored in the storage system 208. The computerized code includes instructions that are executed by the processor 206 to provide functions for the modules 200-204. In one example, the storage system 208 may include a hard disk drive, a flash memory, a cache or another computerized memory device.

The monitoring module 200 broadcasts a DHCP discover packet at an interval in the LAN 10 to detect the DHCP offer packet provided by other servers, such as the servers B and C. The DHCP offer packet records a mode of the servers B and C.

The analyzing module 202 analyzes the DHCP offer packet to determine the mode of the servers B and C. The mode of a server, such as the servers A, B and C, is selected from the group comprising a positive mode and a negative mode. When the server operates in the positive mode, the server provides DHCP service in the LAN 10, and when the server operates in the negative mode, the server does not provide DHCP service in the LAN 10.

The mode setting module 204 sets the mode of the server A to the negative mode when the sever A boots up, and maintains the server A in the negative mode when the servers B and C operate in the positive mode, and sets the mode of the server A to the positive mode when the monitoring module 200 has not detected the DHCP offer packet.

In the present embodiment, the DHCP offer packets further record runtimes of the servers B and C, and the runtimes refer to time during which the servers B and C have operated in the LAN 10.

In the present embodiment, the analyzing module 202 compares a runtime of the server A with the runtimes of the servers B and C respectively, and the mode setting module 204 sets the mode of the server A to the positive mode upon the condition that the runtime of the server A is greater than the runtimes of the servers B and C.

In the present embodiment, the DHCP offer packet also records a random back-off time of a server, such as the servers B and C. The random back-off time refers to a random waiting time after which the servers B and C provide the DHCP offer packet.

In the present embodiment, the analyzing module 202 compares a random back-off time of the server A with the random back-off time of the servers B and C, and the mode setting module 204 sets the mode of the server A to the positive mode upon the condition that the random back-off time of the server A is greater than the random back-off time of the servers B and C. In one embodiment, the random back-off time of the server A is created at random within a predefined scope of the random back-off time when the server A boots up, and the predefined scope of the random back-off time ranges from three to five times as long as the interval of the broadcasting of the DHCP discover packet. For example, if the interval is two seconds, the predefined scope of the random back-off time ranges from six to ten seconds.

In one embodiment, when the analyzing module 202 compares the runtimes of servers A, B and C, the runtime may include a delay, and the delay is calculated according to a formula: the delay=(a time that the server A receives the DHCP offer packet−a time that the server A transmits the DHCP discover packet)/2.

In one embodiment, if the DHCP offer packets do not record modes and runtimes of the servers B and C, the mode setting module 204 labels the modes of the servers B and C as the negative modes and the runtimes of the servers B and C as zero.

In one embodiment, the mode of the server A is a supervisor mode in which the server A provides DHCP service all the time regardless of the mode of the servers B and C. The supervisor mode of the server A can be set by the mode setting module 204 according to a command of a user.

The server A adjusts automatically its mode according to the comparison of the modes, runtimes and the random back-off times between the server A and the servers B and C. The present disclosure prevents conflicts caused by the several servers working at the same time in the LAN 10.

Figure 3:
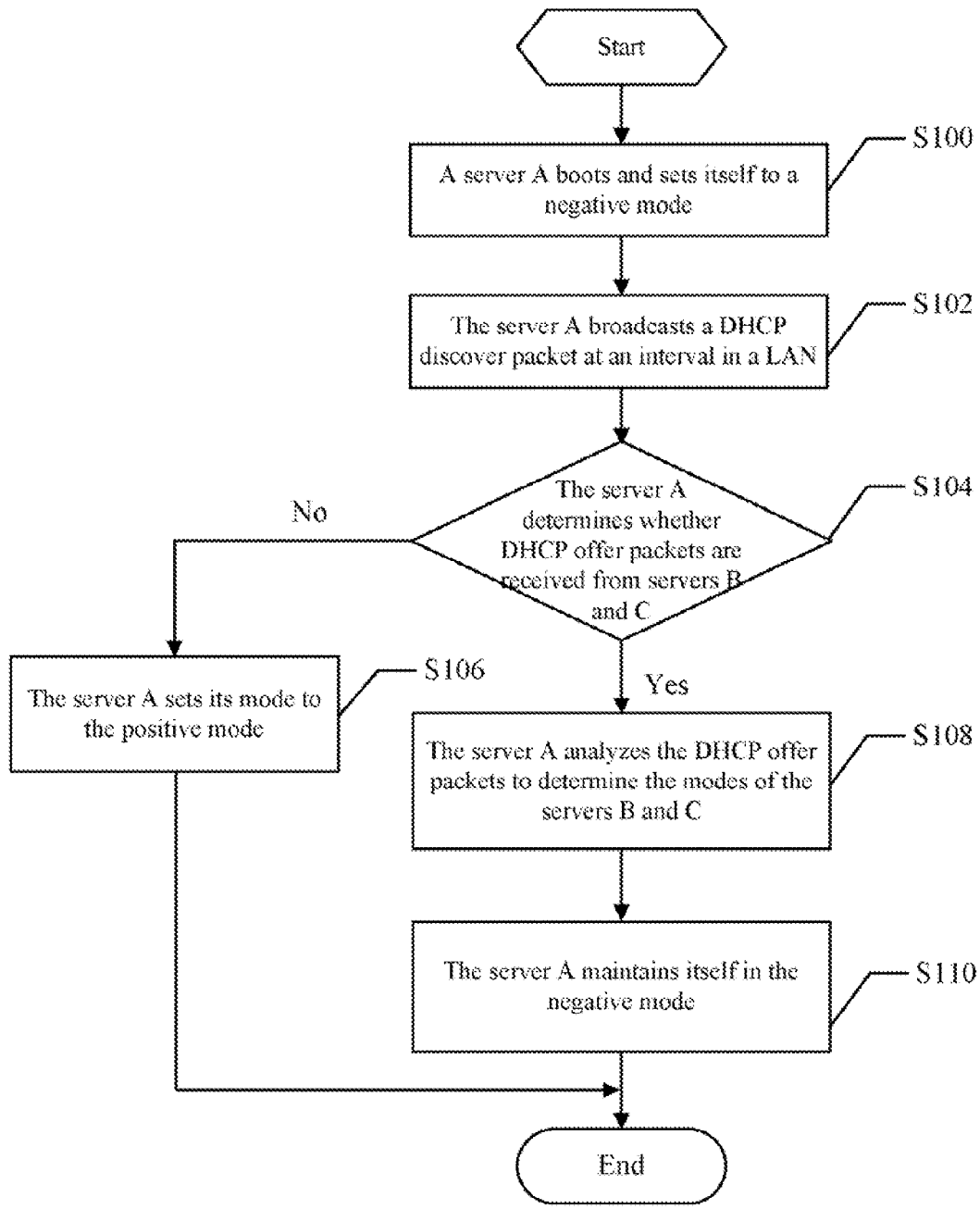
FIG. 3 is a flowchart of one embodiment of a method for setting a mode of a server.

FIG. 3 is a flowchart of one embodiment of a method for setting a mode of the server A. In one embodiment, the method functions in the application environment in FIG. 1 and by the modules in FIG. 2 in the manner following.

In block S100, the server A boots and sets itself to the negative mode.

In block S102, the server A broadcasts a DHCP discover packet at an interval in the LAN 10 to detect a DHCP offer packet transmitted by the other servers, such as the servers B and C in the LAN 10. In one embodiment, the interval is two seconds.

In block S104, within a short duration (such as two seconds), the server A determines whether the DHCP offer packets are received from the servers B and C in the network. The servers B and C may transmit DHCP offer packets in response to the DHCP discover packet received from the server A.

In one embodiment, a DHCP offer packet may record a mode of a server. If the DHCP packet transmitted by the server B, the DHCP packet may record a mode of the server B. A mode of a server, such as the server A, B or C, may be selected from the group including a positive mode and a negative mode. When the server operates in the positive mode, the server provides DHCP service in the LAN 10 and allocates an IP address to the client 100 automatically. When the server operates in the negative mode, the server A does not provide DHCP service in the LAN 10.

In block S106, the server A sets its mode to the positive mode when does not detect any DHCP offer packet transmitted by the servers B and C in the LAN 10 within the short duration.

In block S108, if the server A detects the DHCP offer packets transmitted by the servers B and C, the server A analyzes the DHCP offer packets to determine the modes of the servers B and C.

In block S110, the server A maintains itself in the negative mode and does not provide DHCP service in the LAN 10 if at least one of the servers B and C operates in the positive modes.

Figure 4:
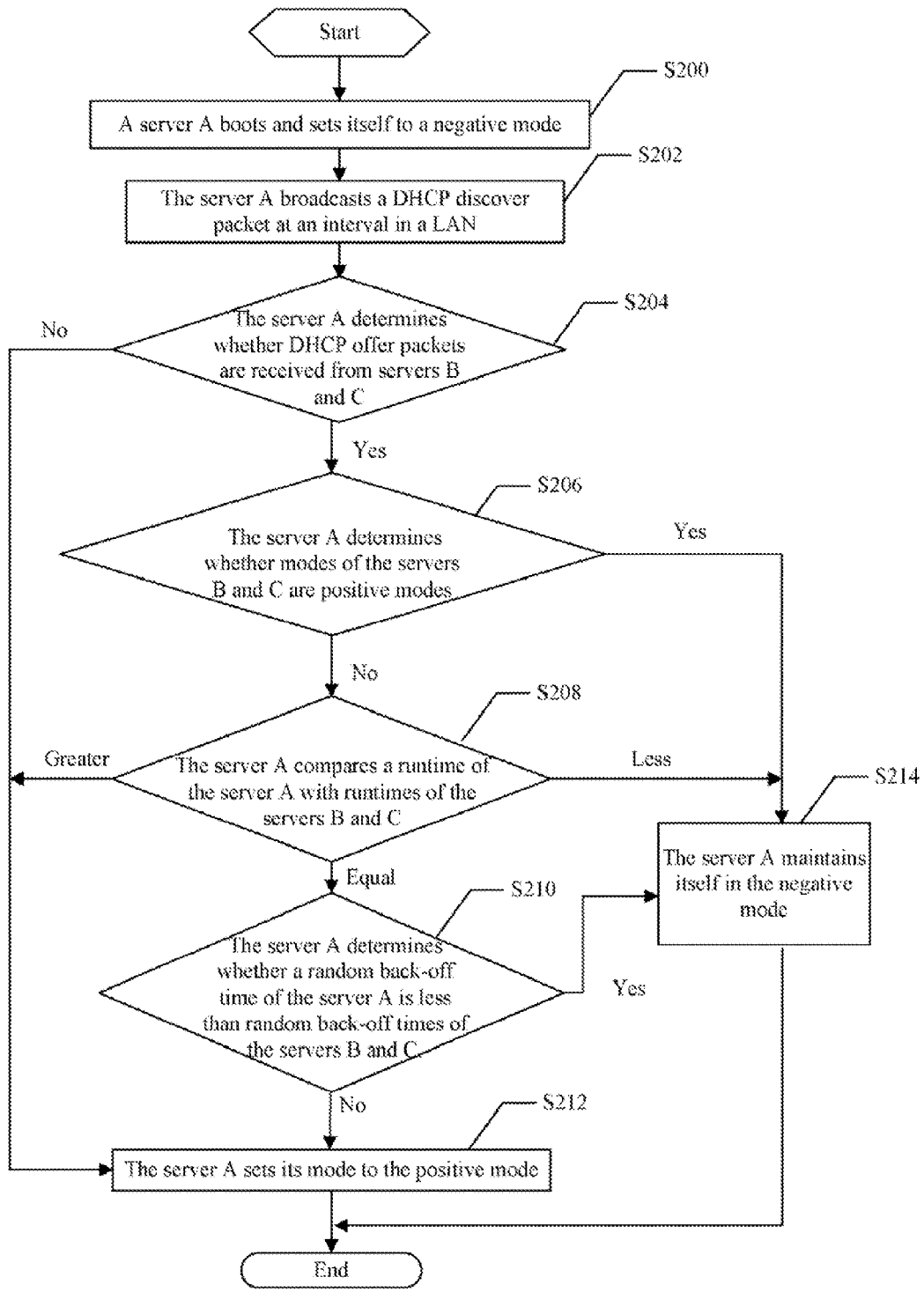
FIG. 4 is a flowchart of another embodiment of a method for setting a mode of a server.

FIG. 4 is a flowchart of another embodiment of a method for setting a mode of the server A. FIG. 4 differs from FIG. 3 in block S204~S214. In the present embodiment, the DHCP offer packets may record modes, runtimes and random back-off times of the servers B and C. In one embodiment, the runtime refers to a time during which a server has operated in the LAN 10, and the random back-off time refers to a random waiting time after which a server provides the DHCP offer packet.

In block S204, the server A monitors the LAN 10 to detect the DHCP offer packet provided by the other servers such as the servers B and C in the network. If the server A does not detect the DHCP packet in the LAN 10, block S212 is implemented and the server A sets itself to the positive mode and provides DHCP service to the client 100.

In block S206, if the server A detects the DHCP offer packets from the servers B and C, the server A analyzes the DHCP offer packets and determines whether the modes of the servers B and C are positive modes. If at least one of the servers B and C operates in the positive mode, block S214 is implemented and the server A maintains itself in the negative mode and does not provide DHCP service to the client 100.

In block S208, if the servers B and C operate in the negative modes, the server A compares a runtime of the server A with the runtimes of the servers B and C respectively. If the runtime of the server A is less than at least one of the runtimes of the servers B and C, the S214 is implemented and the server A maintains itself in the negative mode and does not provide DHCP service to the client 100. If the runtime of the server A is greater than the runtimes of the servers B and C, the S212 is implemented and the server A sets its mode to the positive mode.

In block S210, if the runtime of the server A is equal to the runtimes of the servers B and C, the server A compares the random back-off time of the server A with the random back-off times of the servers B and C. If the random back-off time of the server A is less than at least one of the random back-off times of the servers B and C, and the server maintains itself to the positive mode and does not provide DHCP service to the client 100.

In block S212, if the random back-off time of the server A is greater than the random back-off times of the servers B and C, the server A sets its mode to the positive mode and provide DHCP service to the client 100.

In one embodiment, the random back-off time of the server A is created at random within a predefined scope of the random back-off time when the server A boots up, and the predefined scope of the random back-off time ranges from three to five times as long as the interval of the broadcasting of the DHCP discover packet. For example, if the interval is two seconds, the predefined scope of the random back-off time ranges from six to ten seconds.

Figure 5:
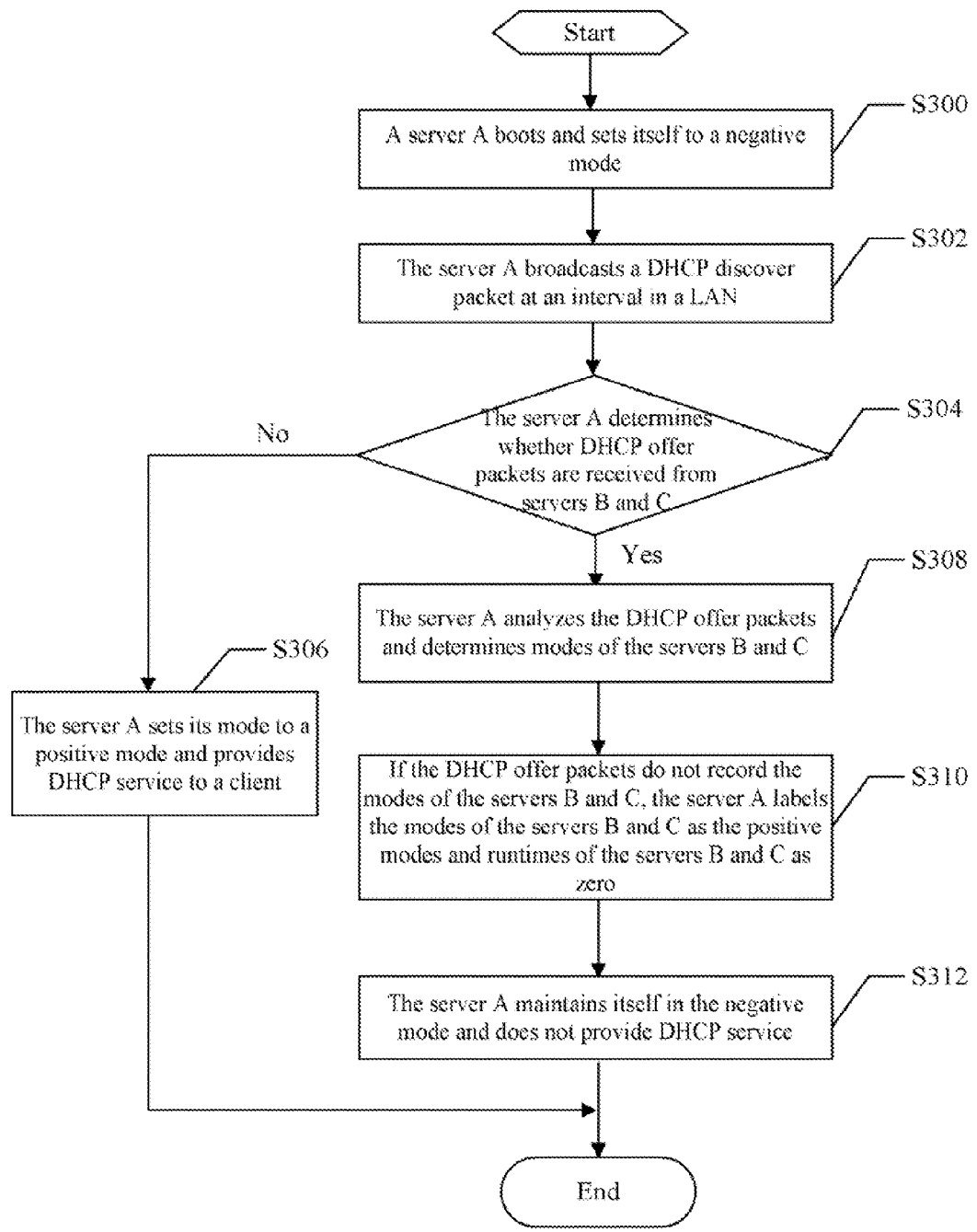
FIG. 5 is a flowchart of another embodiment of a method for setting a mode of a server.

FIG. 5 is a flowchart of another embodiment of a method for setting a mode of the server A. FIG. 5 differs from FIG. 3 in block S304~S312.

In block S304, the server A monitors the LAN 10 to detect the DHCP offer packet provided by the other servers such as the servers B and C in the network.

In block S306, if the server A does not detects the DHCP offer packets, the server A sets its mode to the positive mode and provides DHCP service to the client 100.

In block S308, if the server detects the DHCP offer packets, the server A analyzes the DHCP offer packets and determines the modes of the servers B and C. In the present embodiment, the DHCP offer packets may record modes and runtimes of the servers B and C.

In block S310, if the DHCP offer packets do not record the modes of the servers B and C, the server A labels the modes of the servers B and C as the positive modes and the runtimes of the servers B and C as zero. For example, if the DHCP offer packet is transmitted by the server B and the DHCP offer packet does not record the mode of the server B, the server B can only operate in the positive mode and its runtime is labeled as zero.

In block S312, the server A maintains itself in the negative mode and does not provide DHCP service.

The server A adjusts automatically its mode according to the comparison of the modes, runtimes and the random back-off times between the server A and the servers B and C. The present disclosure prevents conflicts caused by the several servers working at the same time in the LAN 10.

What is claimed is:

1. A server, for automatically setting a mode of the server according to a state of a network of the server, wherein the mode of the server is selected from the group comprising a positive mode and a negative mode, and when the server operates in the positive mode, the server provides Dynamic Host Configuration Protocol (DHCP) service in the network, and when the server operates in the negative mode, the server does not provide DHCP service in the network, the server comprising:

at least one processor;
a storage system;
one or more programs that are stored in the storage system and are executed by the at least one processor, comprising:
a monitoring module detecting a DHCP offer packet provided by another DHCP server in the network, wherein the DHCP offer packet records a mode of the another DHCP server;
an analyzing module, determining the mode of the another DHCP server according to the DHCP offer packet; and
a mode setting module, setting the mode of the server to the negative mode when the sever boots, maintaining the server in the negative mode when the another DHCP server operates in the positive mode, and setting the mode of the server to the positive mode when the monitoring module does not detect the DHCP offer packet in the network,
wherein the monitoring module broadcasts an DHCP discover packet at an interval in the network to detect the DHCP offer packet in the network.

2. The server as claimed in claim 1, wherein the DHCP offer packet further records a runtime of the another DHCP server, wherein the runtime refers to a time during which the another DHCP server operates in the network.

3. The server as claimed in claim 2, wherein the analyzing module compares a runtime of the server with the runtime of the another DHCP server, and the mode setting module sets the mode of the server to the positive mode upon the condition that the runtime of the server is greater than the runtime of the another DHCP server.

4. The server as claimed in claim 2, wherein the DHCP offer packet also records a random back-off time of the another DHCP server, and the random back-off time refers to a random waiting time after which the another DHCP server provides the DHCP offer packet.

5. The server as claimed in claim 2, wherein the analyzing module compares a random back-off time of the server with the random back-off time of the another DHCP server, and the mode setting module sets the mode of the server to the positive mode upon the condition that the random back-off time of the server is greater than the random back-off time of the another DHCP server.

6. The server as claimed in claim 5, wherein the random back-off time of the server is created at random within a predefined scope of the random back-off time when the server boots up, and the predefined scope of the random back-off time ranges from three to five times as long as the interval of the broadcasting of the DHCP discover packet.

7. The server as claimed in claim 6, wherein the interval is two seconds, and the predefined scope of the random back-off time ranges from six to ten seconds.

8. The server as claimed in claim 6, wherein the runtime of the server comprises a delay, and the delay is calculated according to a formula: the delay=(a time that the server receives the DHCP offer packet-a time that the server transmits the DHCP discover packet)/2.

9. The server as claimed in claim 8, wherein mode setting module labels the mode of the another DHCP server as the negative mode and the runtime of the another DHCP server as zero upon the condition that the DHCP offer packet dose not record the mode and the runtime of the another DHCP server.

10. The server as claimed in claim 1, wherein the mode of the server is selected from the group further comprising a supervisor mode in which the server provides DHCP service all the time regardless of the mode of the another DHCP server, and the supervisor mode of the server can be set according to a command of a user.

11. A method for setting a mode of a server, wherein the modes of the server can be set automatically according to a state of a network in which the server works, and the mode of the server is selected from the group comprising a positive mode and a negative mode, and when the server operates in the positive mode, the server provides Dynamic Host Configuration Protocol (DHCP) service in the network, and when the server operates in the negative mode, the server does not provide DHCP service in the network, comprising:

setting the mode of the server to the negative mode when the sever boots up;

detecting a DHCP offer packet provided by another DHCP server in the network, wherein the DHCP offer packet records a mode of the another DHCP server;

setting the mode of the server to the positive mode when no DHCP offer packet is provided by the another DHCP server in the network;

determining the mode of the another DHCP server according to the DHCP offer packet when the DHCP offer packet is provided by the another DHCP server in the network; and maintaining the server in the negative mode when the another DHCP server operates in the positive mode, wherein detecting a DHCP offer packet provided by another DHCP server in the network further comprises: broadcasting a DHCP discover packet at an interval in the network to detect the DHCP offer packet in the network.

12. The method as claimed in claim 11, wherein the DHCP offer packet further records a runtime of the another DHCP server, and the runtime refers to a time during which the another DHCP server operates in the network.

13. The method as claimed in claim 12, further comprising: comparing a runtime of the server with the runtime of the another DHCP server; setting the mode of the server to the positive mode upon the condition that the runtime of the server is greater than the runtime of the another DHCP server.

14. The method as claimed in claim 13, wherein the DHCP offer packet also records a random back-off time of the another DHCP server, and the random back-off time refers to a random waiting time after which the another DHCP server provides the DHCP offer packet.

15. The method as claimed in claim 14, further comprising: comparing a random back-off time of the server with the random back-off time of the another DHCP server; setting the mode of the server to the positive mode upon the condition that the random back-off time of the server is greater than the random back-off time of the another DHCP server.

16. The method as claimed in claim 15, wherein the random back-off time of the server is created at random within a predefined scope of the random back-off time when the server boots up, and the predefined scope of the random back-off time ranges from three to five times as long as the interval of the broadcasting of the DHCP discover packet.

17. The method as claimed in claim 16, wherein the interval is two seconds, and the predefined scope of the random back-off time ranges from six to ten seconds.

18. The method as claimed in claim 16, wherein the runtime of the server comprises a delay, and the delay is calculated according to a formula: the delay=(a time that the server receives the DHCP offer packet-a time that the server transmits the DHCP discover packet)/2.

19. The method as claimed in claim 18, further comprising: labeling the mode of the another DHCP server as the negative mode and the runtime of the another DHCP server as zero upon the condition that the DHCP offer packet dose not record the mode and the runtime of the another DHCP server.

20. The method as claimed in claim 18, wherein the mode of the server is selected from the group further comprising a supervisor mode in which the server provides DHCP service all the time regardless of the mode of the another DHCP server, and the supervisor mode of the server can be set according to a command of a user.

* * * * *